United States Patent Office 3,203,398
Patented Aug. 31, 1965

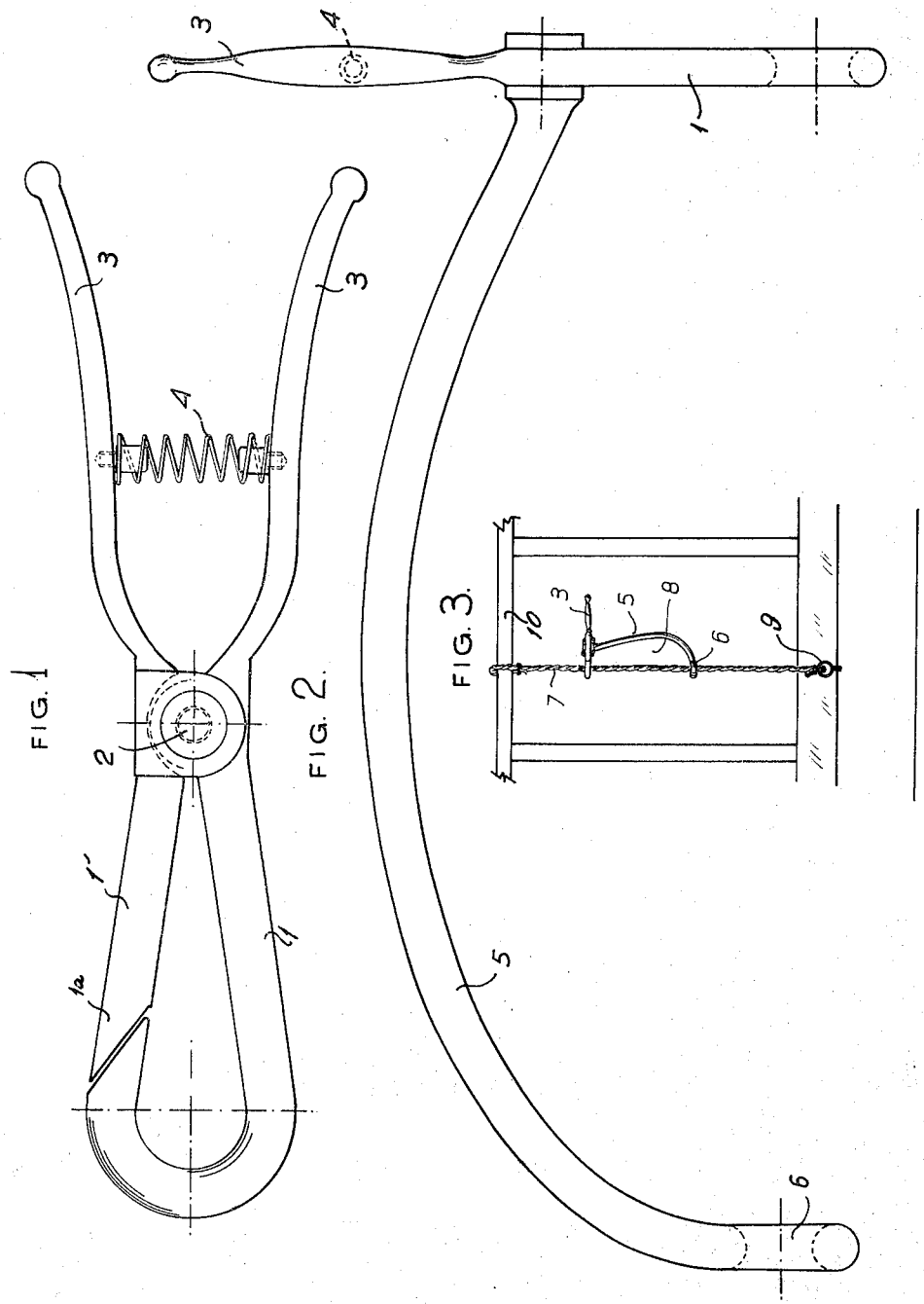

3,203,398
APPARATUS FOR ATTACHING ANIMALS IN STABLES AND SHEDS
Fernando Garcia Eguizabal, Barrio de Quintana, Cobreces, Spain
Filed Apr. 22, 1964, Ser. No. 361,846
Claims priority, application Spain, Apr. 22, 1963, 98,990
4 Claims. (Cl. 119—119)

It has always been desired to attach animals in stables and sheds without resorting to the direct use of ropes, rings or chains which all lead to serious drawbacks by reason of the reduced reliability of such devices and also because it is inconvenient with such arrangements to provide for constantly attaching and releasing cattle and horses.

My invention has for its object an improved arrangement designed for securing and efficiently tethering the animals in stanchions in stables and sheds in an extremely clean manner without preventing the animals from lying down or moving sideways within a limited and controlled area while escape is entirely prevented. Thus, through its actual structure my improved arrangement makes it unnecessary to resort to halters and the like harnesses which are anti-hygienic and troublesome for the animals.

My improved mechanical arrangement includes chiefly a large pincer member the arms of which meet at their free end so as to form a snap-hook, the rear ends of said pincers forming handles adapted to operate after the manner of a set of levers pivoting round a central stud. Between said handles is fitted a spring urging the pincer arms apart and of which it is necessary to overcome the resistance by compressing it so as to open the clasp hook.

An elongated arm forming a projection on said pincers is secured coaxially to the pivotal means of the pincers and in a plane substantially perpendicular to that of the pincers. Said elongated arm shows a very marked curvature and its free end carries a ring located in registry with the clasp-hook terminating the pincers, on a line perpendicular to the plane of the pincers. To position the arrangement described in the stable or shed, there is provided an upright extending vertically or substantially vertically between ground and the ceiling or upper framework of the stanchion, stable or shed said upright being adapted to extend through the closed snap hook on the pincers and also through the ring provided at the outer free end of the projecting incurved arm.

Thus, there is formed between the stationary upright and the apparatus including the pincers and the incurved arm an empty space forming a movable collar adapted to be engaged over the neck of the animal to be held in position.

The upright over which the appliance described is slidingly and rotatably fitted may be constituted by a thick rope, a cable or a chain and be provided thus with some elasticity or else I may restore to more rigid uprights such as rods or heavy supporting members.

It will now describe my invention with further detail, reference being had to the accompanying drawings illustrating a preferred embodiment thereof. In said drawings:

FIG. 1 is a plan view of a tethering device according to the present invention;

FIG. 2 is a view in elevation on reduced scale of the device shown in FIG. 1, and FIG. 3 is a view in elevation on a further reduced scale of a stanchion including the device shown in FIGS. 1 and 2.

The appliance or tethering device is constituted by pincers or latch members 1 and 1' the front end of which is closed after the manner of a snap-hook at 1a. The pivot connection of said pincers is shown at 2 while its handles or rear arms 3 are urged apart by the spring 4. The projecting arm 5, extending substantially in a plane perpendicular to the plane of the pincers, connects the pivotal connection 2 of the pincers with a terminal ring 6 lying coaxially with the snap-hook by reason of its registering with the latter on a line perpendicular to the plane of the pincers.

In FIG. 3 is shown an upright 7 constituted by a thick rope or the like secured, for example, to a ring 9 anchored in the ground and secured to an upper member 10 of the frame of the stanchion, stable or shed. Said upright 7 is threaded through the snap-hook 1 and the ring 6 which allows thus the appliance 1–3–5–6 to rotate and to move vertically with reference to the upright 7. Consequently, the animal whose neck is held between the appliance and the upright within the collar-forming space 8 can move within certain limits without any possibility of escaping.

Obviously when it is desired to release an animal it is sufficient to close the handles 3 so as to open the snap-hook whereby the collar or yoke formed inside the space 8 is released and the neck of the animal attached inside said space is freed.

What I claim is:

1. A device for tethering livestock in a stanchion having a vertically disposed member, said device comprising a curved bar having an eye at one end for threading on a vertical member of a stanchion, and a latch member on the other end of said bar for releasably encircling such vertical member, said latch member being disposed substantially perpendicularly on the end of said bar and including two cooperative latch elements defining an open loop for freely surrounding the vertical member, at least one of said latch elements being relatively pivoted on the end of said bar, spring means biasing said latch elements into latching position, and handle elements fixed with said latch elements and extending opposite said bar from said latch elements for opening said latch member.

2. A device for tethering animals, comprising a pincer member including two latch elements, the cooperating front ends of which form a snap-hook of open loop shape and the cooperating rear ends form control handles, pivot means connecting said elements between said ends, a spring normally urging said handles apart to close the snap-hook, an arcuate elongated arm rigid at one end with said pivot means and extending substantially perpendicularly from said member, and means at the other end of said arm for engaging slidingly and revolvably a member to be releasably engaged by said latch elements to form with said elongated arm an elongated collar for an animal's neck.

3. A stanchion, comprising a vertically disposed member, a curved bar having an eye on its lower end slidably and rotatively threaded on said vertical member, and a latch member on the upper end of said bar for releasably encircling said vertical member, said latch member being disposed substantially perpendicularly on the end of said bar and including two cooperative latch elements defining an open loop freely surrounding said vertical member, at least one of said latch elements being relatively pivoted on the end of said bar, spring means biasing said latch elements into latching position, and handle elements fixed with said latch elements and extending opposite said bar from said latch elements for opening said latch member.

4. A stanchion for tethering animals, comprising a pincer member including two latch elements, the cooperating front ends of which form a snap-hook of open loop shape and the cooperating rear ends form control handles, pivot means connecting said elements between said ends, a spring normally urging said handles apart to close the snap-hook, an arcuate elongated arm rigid at one end with said pivot means of the pincer member at a point thereof registering with the pivotal axis, a ring rigid with the other end of said arm and registering with the snap-hook on a line perpendicular to the plane of the pincer member, and an elongated substantially vertical member anchored at both ends and threaded through said ring and engageable by said snap-hook to permit sliding and rotary movement of said ring and pincer member on said elongated member under the action of the animal whose neck is engaged between said arcuate arm and said upright member.

References Cited by the Examiner

FOREIGN PATENTS 1,087,400 8/60 Germany.
516,186 12/39 Great Britain.

SAMUEL KOREN, *Primary Examiner.*

HUGH R. CHAMBLEE, *Examiner.*